(No Model.)

F. ROSEBROOK.
REMOVABLE EGG TRAY FOR INCUBATORS.

No. 324,274. Patented Aug. 11, 1885.

WITNESSES:
C. Neveux
C. Sedgwick

INVENTOR:
F. Rosebrook
BY Munn & Co.
ATTORNEYS.

UNITED STATES PATENT OFFICE.

FRANK ROSEBROOK, OF ELMIRA, NEW YORK.

REMOVABLE EGG-TRAY FOR INCUBATORS.

SPECIFICATION forming part of Letters Patent No. 324,274, dated August 11, 1885.

Application filed May 26, 1885. (No model.)

*To all whom it may concern:*

Be it known that I, FRANK ROSEBROOK, of Elmira, in the county of Chemung and State of New York, have invented certain new and useful Improvements in Removable Egg-Trays for Incubators, of which the following is a full, clear, and exact description.

The object of my invention is to provide a new and improved egg-tray for incubators, whereby the eggs can be reversed easily and are fully exposed to the action of the heat in the apparatus.

The invention consists in a removable egg-tray for incubators formed of a frame having a wire-netting bottom on which beveled strips are secured.

Reference is to be had to the accompanying drawings, forming part of this specification, in which similar letters of reference indicate corresponding parts in all the figures.

Figure 1:
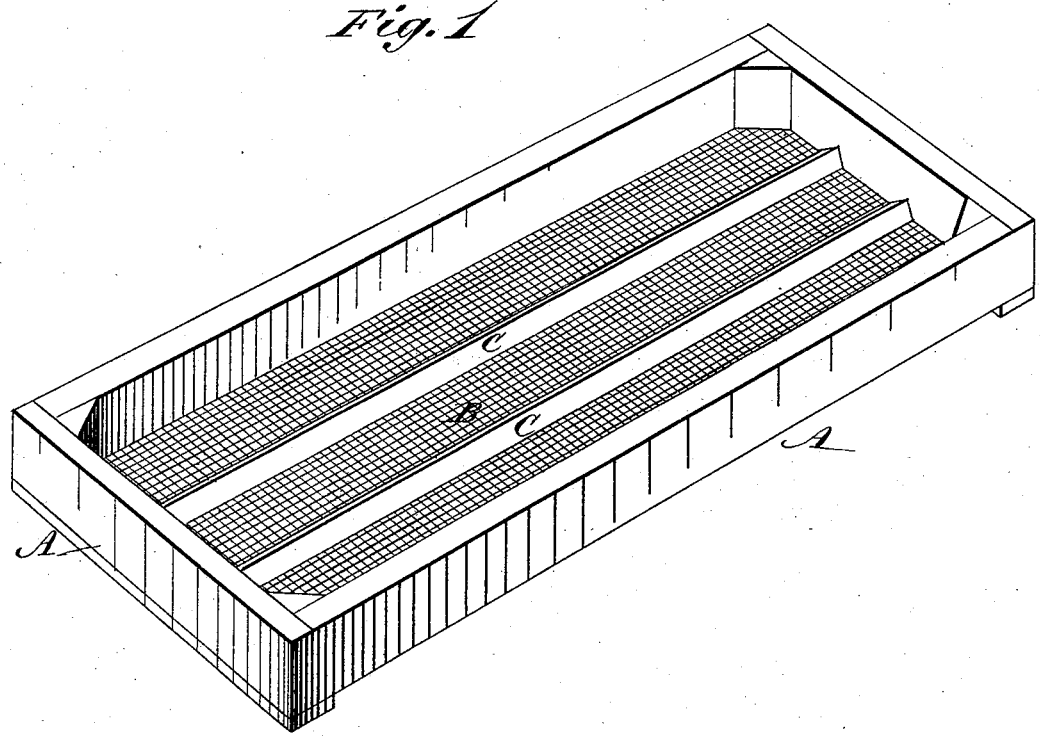
Figure 2:
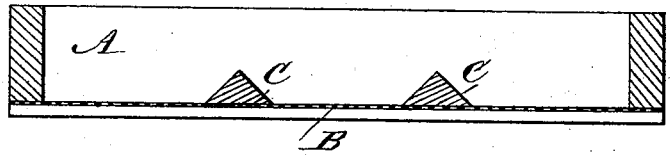

Figure 1 is a perspective view of my improved egg-tray. Fig. 2 is a cross-sectional view of the same.

The frame A of my improved egg-tray is made square or oblong, as may be desired, the latter form being preferred, and to the bottom edges of the said frame wire-netting B, or any other suitable apertured, perforated, or rolled material is secured, which wire-netting forms the bottom of the tray. On the said wire-netting one, two, or more strips, C, are placed, which are secured to the ends of the frame and are beveled on both sides, and which divide the tray into two, three, or more sections, according to the width of the tray. The netting is tacked to the under sides of the strips. The beveled strips are separated such a distance that an egg of the usual and average size can be placed between the strips upon the netting. The eggs are then placed in longitudinal rows on the bottom of the tray, each being placed transversely to the length of the row.

The eggs can be turned very easily by using two trays, holding them together and reversing them, so that the eggs pass from one to the other and are turned.

As the bottom of the tray is apertured the heat and moisture can easily pass up through to the eggs.

In case an egg breaks and soils the tray the tray can easily be cleaned, as it has no rollers.

Having thus described my invention, I claim as new and desire to secure by Letters Patent—

A removable egg-tray for incubators, consisting of a frame, wire-netting secured to the same and forming the bottom thereof, and beveled strips secured in the frame and on the top of said netting and dividing the tray into compartments, the said strips being separated from each other a distance equal to the length of an egg, substantially as herein shown and described.

FRANK ROSEBROOK.

Witnesses:
OSCAR F. GUNZ,
C. SEDGWICK.